United States Patent
Perego et al.

(10) Patent No.: US 9,892,824 B2
(45) Date of Patent: Feb. 13, 2018

(54) METHOD OF MANUFACTURING POWER CABLES

(71) Applicant: PRYSMIAN S.p.A., Milan (IT)

(72) Inventors: Gabriele Perego, Milan (IT); Paolo Liboi, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 15/034,606

(22) PCT Filed: Nov. 11, 2013

(86) PCT No.: PCT/EP2013/073483
§ 371 (c)(1),
(2) Date: May 5, 2016

(87) PCT Pub. No.: WO2015/067323
PCT Pub. Date: May 14, 2015

(65) Prior Publication Data
US 2016/0276066 A1    Sep. 22, 2016

(51) Int. Cl.
*H01B 7/28* (2006.01)
*H01B 7/282* (2006.01)
(Continued)

(52) U.S. Cl.
CPC ............. *H01B 7/2825* (2013.01); *H01B 7/14* (2013.01); *H01B 9/006* (2013.01); *H01B 9/02* (2013.01); *H01B 13/22* (2013.01); *H01B 13/26* (2013.01)

(58) Field of Classification Search
CPC ... B22F 7/04; B22F 7/08; B23K 20/00; B23K 20/001; B23K 31/02; B32B 15/01;
(Continued)

(56) References Cited

U.S. PATENT DOCUMENTS 3,137,120 A * 6/1964 Budenbender ..... H01B 13/2613
156/304.3
3,159,513 A * 12/1964 Baier ............. B29C 61/006
156/294
(Continued)

FOREIGN PATENT DOCUMENTS

CN 202839076 U 3/2013
WO WO-2006/021757 A1 3/2006
WO WO-2011/078865 A1 6/2011

OTHER PUBLICATIONS

International Search Report PCT/ISA/210 for International Application No. PCT/EP2013/073483, dated Jul. 29, 2014.
(Continued)

*Primary Examiner* — Carl Arbes
(74) *Attorney, Agent, or Firm* — MH2 Technology Law Group LLP

(57) ABSTRACT

A method for manufacturing power cables may include: providing at least one insulated conductor; and/or arranging a water barrier around the at least one insulated conductor. Arranging the water barrier may include: providing foil having opposite edges; wrapping the foil around the at least one insulated conductor until the edges of the foil overlap; fastening the overlapped edges of the foil to each other with bonding agent to form a corresponding foil seam; and/or depositing a metal coating on the foil at the seam by a thermal spray process. A power cable may include: at least one insulated conductor; at least one first water barrier surrounding the at least one insulated conductor, the at least one first water barrier being wrapped foil having edges overlapped and fastened by bonding agent, the overlapped edges and bonding agent forming a foil seam; and/or a thermal sprayed metal coating on the seam.

7 Claims, 6 Drawing Sheets

(51) Int. Cl.
*H01B 7/14* (2006.01)
*H01B 9/00* (2006.01)
*H01B 9/02* (2006.01)
*H01B 13/22* (2006.01)
*H01B 13/26* (2006.01)

(58) Field of Classification Search
CPC ......... B32B 15/043; B32B 15/16; H01B 7/14; H01B 7/2825; H01B 9/006; H01B 9/02; H01B 13/22; H01B 13/26
See application file for complete search history.

(56) References Cited

U.S. PATENT DOCUMENTS

| | | | | |
|---|---|---|---|---|
| 3,575,748 | A * | 4/1971 | Polizzano | H01B 13/266 156/54 |
| 3,733,225 | A * | 5/1973 | Moody | H01B 13/22 156/47 |
| 4,075,419 | A * | 2/1978 | Virkus | H01B 9/022 174/102 D |
| 4,221,926 | A * | 9/1980 | Schneider | H01B 7/2825 156/212 |
| 4,319,940 | A * | 3/1982 | Arroyo | H01B 7/295 156/185 |
| 4,482,413 | A * | 11/1984 | Bohannon, Jr. | H01B 13/262 156/203 |
| 4,487,641 | A * | 12/1984 | Bohannon, Jr. | G02B 6/448 156/201 |
| 4,510,346 | A * | 4/1985 | Bursh, Jr. | H01B 11/1016 174/106 R |
| 4,647,720 | A * | 3/1987 | Vokey | H01B 13/2686 174/102 D |
| 6,093,893 | A * | 7/2000 | Fang-Crichton | H01B 9/02 174/102 R |
| 9,136,043 | B2 * | 9/2015 | Brown | H01B 11/06 |
| 9,486,832 | B2 * | 11/2016 | Sherman | C23C 24/08 |
| 2007/0194085 | A1 | 8/2007 | Spinella et al. | |
| 2013/0068497 | A1 * | 3/2013 | Cinquemani | H01B 7/2813 174/105 R |

OTHER PUBLICATIONS

Written Opinion of the International Searching Authority PCT/ISA/237 for International Application No. PCT/EP2013/073483, dated Jul. 29, 2014.
Handbook of Thermal Spray Technology, "Introduction to Thermal Spray Processing", ASM International, pp. 3-13 (2004).
T. Worzyk, "Submarine Power Cables: Design, Installation, Repair, Environmental Aspects", Springer, pp. 1, 2, and 31-33 (2009).

* cited by examiner

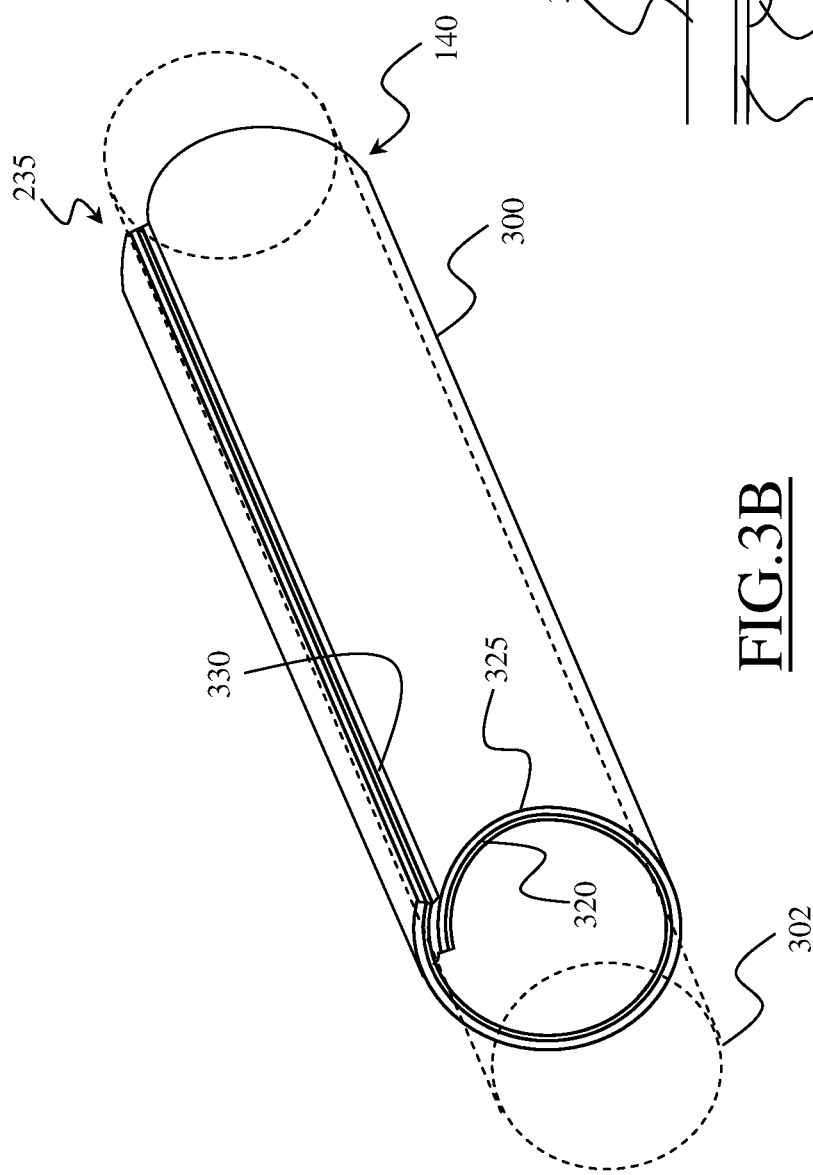
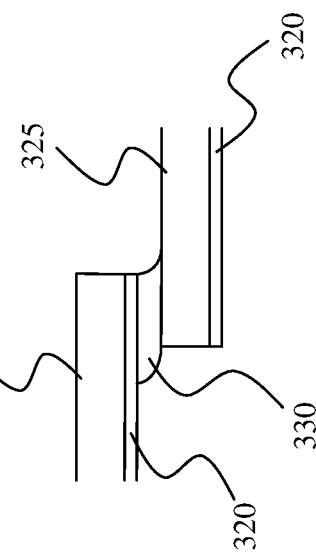
FIG.3B
FIG.3C

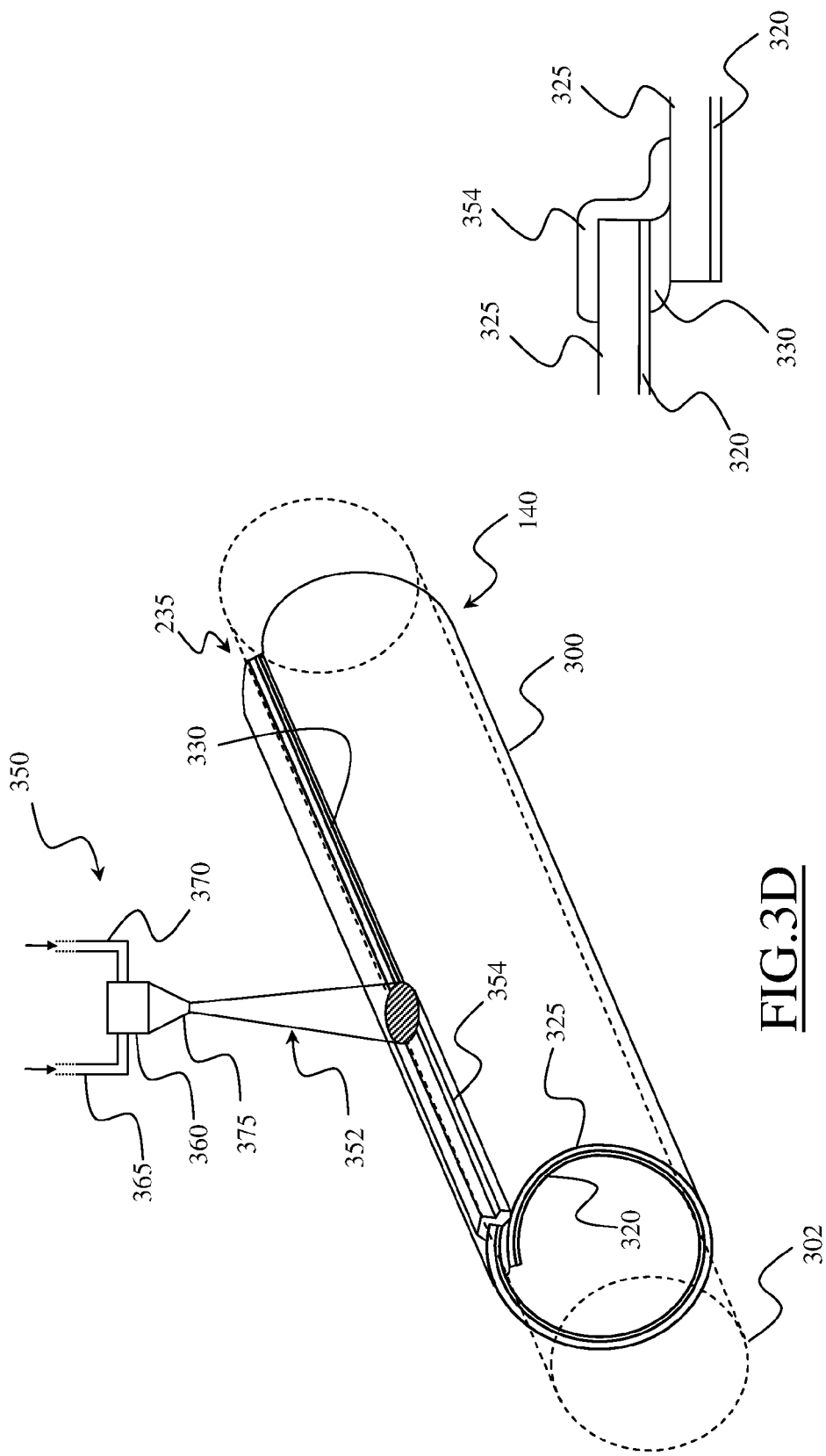

METHOD OF MANUFACTURING POWER CABLES

CROSS-REFERENCE TO RELATED APPLICATION(S)

This application is a national stage entry from International Application No. PCT/EP2013/073483, filed on Nov. 11, 2013, in the Receiving Office of the European Patent Office, and published on May 14, 2015, as International Publication No. WO 2015/067323 A1, the entire contents of which are incorporated herein by reference.

BACKGROUND OF THE INVENTION

Field of the Invention

The present invention generally relates to the field of power cables for electric power transmission and distribution, in particular to cables for underground and submarine use.

Description of the related art

Power cables for power transmission in the low voltage (up to 1 kV) and particularly medium voltage (MV) and high voltage (HV) ranges (from 1 kV to 35 kV for MV and higher than 35 kV for HV, respectively) typically comprise one or more insulated conductors (one insulated conductor for single-phase power transmission, three insulate conductors for 3-phase power transmission; cables with a single insulated conductor are also referred to as "single-core" cables, while cables with more than one insulated conductor are also referred to as "multi-core" cables). With "insulated conductor" it is meant an electrical conductor surrounded at least by a polymeric insulating layer. An inner and/or an outer semiconducting layer can be disposed around the conductor and the insulating layer, respectively. An armour, for example of metal wires or metal tapes, can be provided to surround each core for providing resistance to tensile stress. A polymeric sheath is typically provided as outermost layer.

When a power cable has to be installed in a wet or potentially wet environment, such as underground or underwater, its insulated conductor/s should be protected from humidity penetration that may lead to electrical breakdown. For this purpose, the cable is equipped with a water barrier, which can be provided around each insulated conductor and/or around the bundle of insulated conductors for preventing or at least reducing the occurrences of water trees possibly producing electrical breakdown.

Different types of water barrier are known. For example, T. Worzyk, Submarine Power Cables, Power Systems, Springer-Verlag Berlin Heidelberg 2009, pages 30-33 discloses that aluminium, lead, copper, and other metals can be used as water-blocking sheath in a variety of shapes. Laminated aluminium sheaths consisting of a thin aluminium foil pre-laminated with a layer of PE-copolymers can be formed around the cable core with the polymeric layer outside. The edges of the laminate strip are glued together with overlap. Tiny amounts of humidity might diffuse into the cable through the glued seam.

U.S. Pat. No. 4,221,926 discloses waterproof cables of the type having a metallic shield formed with a longitudinal seam wrapped about a cable core. In particular, the cable is formed with an outer shield composed of a strong metal to provide the cable with structural strength. The outer shield is wrapped about the core in a generally cylindrical configuration with one longitudinal edge overlaying another longitudinal edge thereby forming a shield seam. The shield seam is overlayed with a strip of tape, typically a laminated structure composed of aluminium foil, Kraft paper, and Mylar film, or, alternatively, of polyolefin, such as a spunbonded, high density polyethylene fibrous material or a biaxially oriented polypropylene film.

Simple, cheap and versatile water barrier implementations particularly suited to underground cables (both of the "buried" and of the "in vault" types) make use of metallic foils or polylaminate foils. A polylaminate foil is a multi-layer foil comprising at least a first layer of metal material, such as aluminium or copper, and a second layer of polymer material, such as polyethylene. For example, U.S. Pat. No. 3,575,748 discloses a cable jacket for electrical cables formed by a tape folded longitudinally around the core of the cable. In the tape there is a metal foil laminate with plastic coating on both its upper and lower surface.

According to known solutions, metal and polylaminate water barriers are manufactured by wrapping a metal or polylaminate foil around the core/s of the cable up to overlap opposite edges thereof one to each other. The wrapped foil is fastened around the core/s by providing a bonding agent, e.g. comprising polymeric adhesive resin, between the overlapping edges thereof.

US 2007/0194085 discloses a low temperature joining method that is compatible with multiple materials and results in a fusion between joined structures without reducing the mechanical properties of the joined structure's base materials. The method includes the steps of contacting a first structure to a second structure; and directing particles of a metallic bonding material towards an interface between the first structure and second structure at a velocity to cause the particles of the metallic bonding material form a molecular fusion between the first structure and second structure.

SUMMARY OF THE INVENTION

The Applicant experienced that the prior art solutions for fastening the overlapping edges of a metal or polylaminate foil are not fully satisfactory since these methods are complicated from a manufacturing point of view and/or cannot ensure a secure and long-standing prevention of the moisture diffusion.

In particular, in case a water barrier formed by a wrapped metal or polylaminate foil with overlapping longitudinal edges (hereinafter "the edges") fastened by polymeric adhesive resin is employed, moisture may diffuse through the adhesive resin and, in the case, through the polymer portion of the polylaminate adjacent to the adhesive resin, and reach the inner layers of the cable down to the insulation layer.

The Applicant considered that a water-tight barrier could be made using a wrapped metal or polylaminate foil provided that a water-tight coating covering the adhesive resin and the overlapping edges of the wrapped foil (hereinafter, globally referred to as "foil seam") is provided. Such water-tight coating should be capable to homogeneously adhere to different substrate materials (i.e., the metal, the adhesive resin and, in the case, the polymer material of the foil) and to provide a non-porous layer. Also, this water-tight coating should be capable of withstanding the mechanical stress which the cable is subjected to.

The Applicant found that the application of a thin layer of metal particles (copper or aluminium) deposited by thermal spraying over the overlapping area is effective to give place to a water-tight coating with substantially null porosity and with sufficient mechanical strength such as to sustain strain and compression stresses without cracking and/or detachment from the substrate. The use of a thermal spraying technique surprisingly allows a uniform and stable adhesion of the metal particles to the different materials present at the foil seam.

An aspect of the present invention provides for a power cable comprising at least one insulated conductor, a water barrier surrounding the insulated conductor, the water barrier being a wrapped foil having edges overlapped and fastened by a bonding agent, the overlapped edges and the bonding agent forming a foil seam; and a thermal sprayed metal coating on the foil seam.

Another aspect of the present invention provides for a process for manufacturing a power cable the method comprising:

providing at least one insulated conductor;
arranging a water barrier around the at least one insulated conductor, said arranging the water barrier comprising:
providing a foil having two opposite edges;
wrapping the foil around the insulated conductor until the edges of the foil are overlapped to each other;
fastening the overlapped edges of the foil to each other with a bonding agent to form a corresponding foil seam;
deposing a metal coating on the foil at the foil seam by a thermal spray process.

According to an embodiment of the invention, the foil is selected from a metal or a polylaminate foil.

In the present description and claims as "polylaminate" it is meant a laminate comprising at least one polymeric layer (first layer) and at least one metal layer (second layer).

In the process and cable according to some embodiments of the present invention, a polylaminate foil is wrapped around the cable conductor/s with the metal layer radially internal to the polymeric layer. This configuration of the polylaminate foil is particularly suitable for high voltage cable when it is desired to maintain an electric continuity of the metal layer with an underlying screen which helps to control the electric field stress. According to other embodiments of the present invention, the polylaminate foil is wrapped around the cable conductor/s with the polymeric layer radially internal to the metal layer. This configuration offers a better protection against the water infiltration.

The metal foil and the metal layer of the polylaminate according to the invention can be made of a metal selected from aluminium or copper or composite thereof.

In the present description and claims as "water barrier" is intended a layer capable of impeding the progress of water and moisture.

The term "thermal spray" describes a family of processes that use thermal or kinetic energy to obtain and/or propel particles of metallic at high speeds towards a surface to be coated (in this case, the water barrier surface at the foil seam, as described, for example in Handbook of Thermal Spray Technology, pages 3-13, 2004 ASM International).

A thermal spray process suitable for the method of the present invention is preferably cold spray process. Cold spray process allows the deposition of a satisfactory metal coating without damaging the sprayed portions, in particular those in polymeric materials. Cold spray process does not require any previous polishing treatment.

The fastening of the overlapped edges to each other with a bonding agent preferably comprises deposing a layer of polymeric adhesive resin between the overlapped edges.

The cable of the invention can be a single core or multi-core cable including a plurality of insulated conductors. In the latter case each insulated conductor can be surrounded by a relevant water barrier or the plurality of insulated conductors can be wrapped by a single water barrier, or both. Preferably a foil is provided around all the insulated conductors of the plurality.

The metal coating may have a thickness of from 0.1 mm to 0.5 mm. Advantageously, the width of the metal coating can be such to cover not only the foil seam, but also the foil surface adjacent to the foil seam. The width of the metal coating can be up to 20 mm or 30 mm. Wider widths are not prejudicial for the cable performance, they just could increase the cable cost. When the foil is a metal foil, the width of the metal coating can be up to 10 mm.

The metal coating material can be selected among those customarily employed in the cable manufacturing, for example copper, aluminium or tin.

The phase of deposing the metal coating preferably provides for spraying a jet comprising metal particles over a portion of the foil surrounding the foil seam.

The metal particles in the jet are preferably accelerated to velocities of 100 to 1500 m/s.

The cable according to the invention may be a submarine cable. The deposed metal coating is suitable for bearing the pressures and stresses of this configuration.

The cable according to the invention may be an underground cable.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

These and other features and advantages of the present invention will be made evident by the following description of some exemplary and non-limitative embodiments thereof, to be read in conjunction with the attached drawings, wherein:

FIGS. 3A-3B illustrate a portion of a cable during phases of the method of FIG. 2 for manufacturing the cable of FIG. 1A;

FIG. 3C is a cross-sectional view of a particular of the cable of FIG. 3B;

FIG. 3D illustrates a portion of the cable during a further phase of the method of FIG. 2 for manufacturing the cable of FIG. 1A;

FIG. 3E is a cross-sectional view of a particular of the cable of FIG. 3D.

DETAILED DESCRIPTION OF EXEMPLARY EMBODIMENTS OF THE INVENTION

Figure 1A:
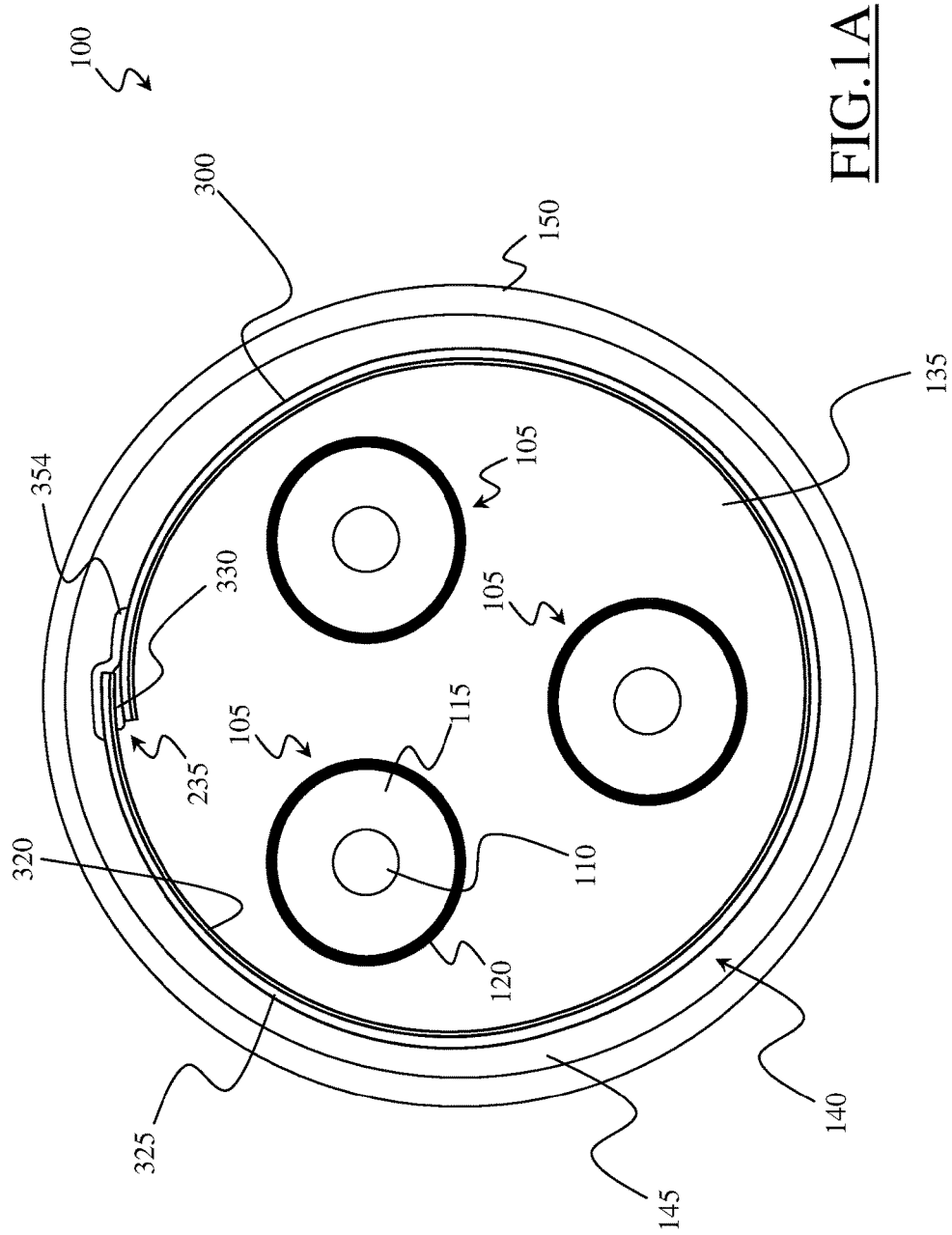
FIGS. 1A and 1B are schematic cross-sectional views of power cables according to embodiments of the invention.
Figure 1B:
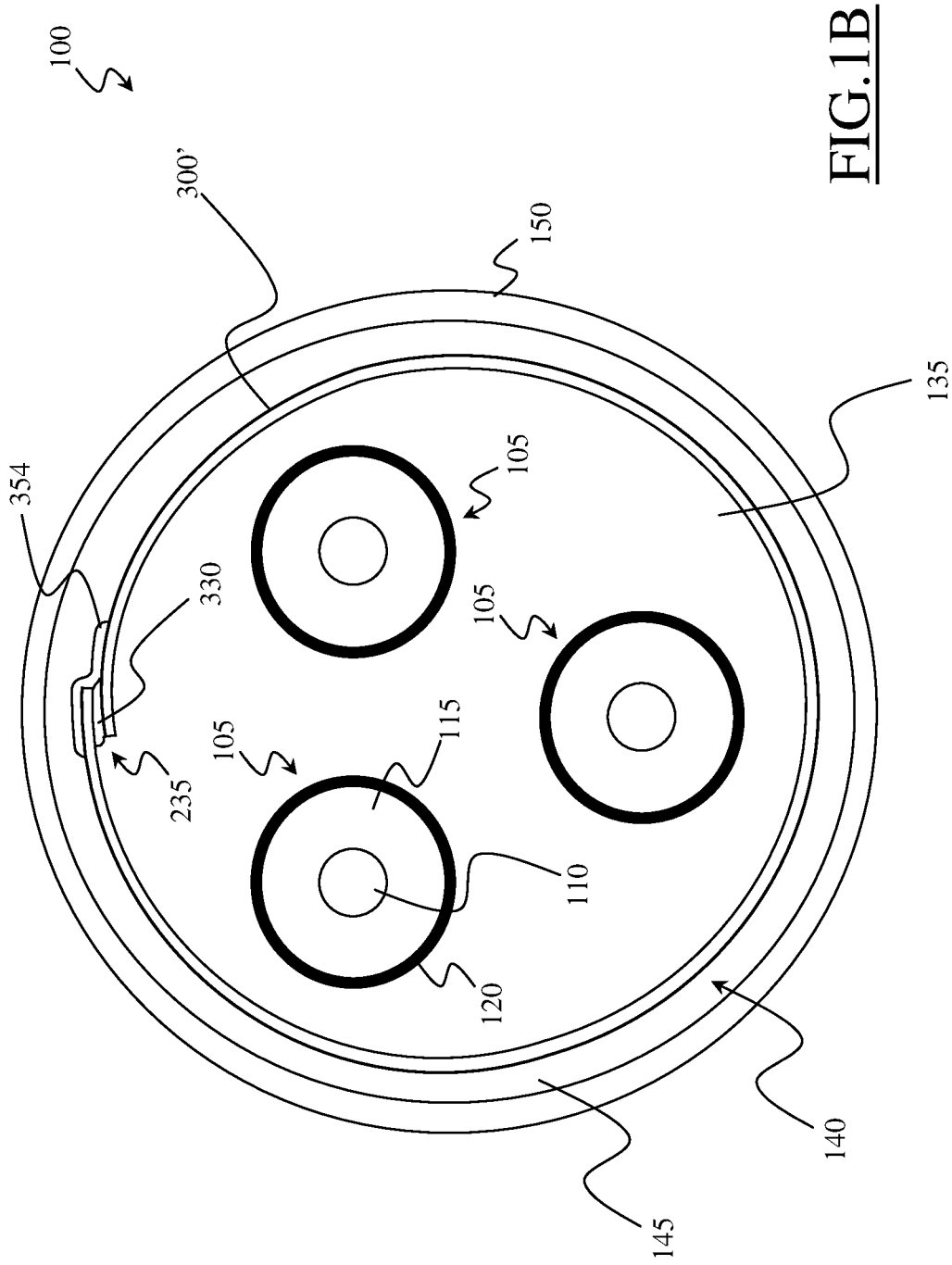

With reference to the drawings, FIGS. 1A and 1B are cross-sectional views of an electrical cable 100, particularly a cable for power transmission in the MV or HV ranges.

The cable 100 comprises three stranded insulated conductors 105. Each insulated conductor 105 comprises an electrical conductor 110, i.e. typically made of copper, aluminium or both, in form of a rod or of stranded wires. The electrical conductor 110 is sequentially surrounded by an inner semiconducting layer, an insulating layer and an outer semiconducting layer around the insulating layer; these three layers are collectively depicted and indicated as core layers 115. The insulating layer may be made of polymeric material (for example, polyethylene or polypropylene), wrapped paper or paper/poly-propylene laminate. The semiconducting layers are typically made of a polymeric material, analogous to that employed for the insulating layer, charged with conductive filler such as carbon black. Around the outer semiconducting layer of each insulated conductor 105, a metal screen 120, for example comprising a single layer of copper wires or a copper braid, is provided. A filler 135 surrounds the insulated conductor 105, forming a structure having a substantially circular radial cross-section. In the present embodiment, the filler 135 is surrounded by a water barrier 140 made of a foil.

Furthermore, cable 100 comprises, in a position radially external to the water barrier 140, a continuous coating layer 145, for example comprising at least one polyamide or a copolymer thereof, surrounded by an outer sheath 150, for example a polyethylene sheath. Similar considerations apply if an armour layer surrounding the water barrier is provided in addition to or in place of the armours surrounding each core; in this case, a bedding layer is preferably provided between the water barrier and said armour layer.

In the embodiment of the invention illustrated in FIG. 1A, the foil of the water barrier 140 is a polylaminate foil 300, while in the embodiment of the invention illustrated in FIG. 1B the foil 300' of the water barrier 140 is a metal foil.

In the case of FIG. 1A, the foil 300 is a two-layer polylaminate foil, with a first layer 320 of metal material, such as aluminium or copper, and a second layer 325 of polymer material, such as polyethylene. Similar considerations apply in case the polylaminate foil has a different structure, for example including more than one layers of metal material and/or more than one layers of polymer material. According to an embodiment of the present invention, the first layer 320 may have a thickness of from 0.15 to 1 mm and the second layer 325 may have a thickness of from 3 to 10 mm.

In the case of FIG. 1B, the water barrier 140 is a foil 300' made of metal, e.g. copper or aluminium. According to an embodiment of the invention, the foil 300' has a thickness of from 0.01 mm to 1 mm.

As will be described in the following, the water barrier 140 is formed by wrapping the foil 300, 300' around the insulated conductors 105 until overlapping the edges of the foil one to each other, so that the water barrier 140 exhibits a foil seam 235 at the overlapping edges of the foil 300, 300' extending substantially parallel to the longitudinal axis of the cable 100. A layer of polymeric adhesive resin 330 is provided between the overlapping edges. The layer 330 fastens the water barrier 140 in form of wrapped metal or polylaminate foil 300, 300' around the insulated conductors 105.

A metal coating 354 lays over a portion of the radially external surface of the water barrier 140 at the foil seam 235. The metal coating 354 can have a thickness of from 0.1 to 0.5 mm and the width the double of that of the foil seam 235. For example, the width of the metal coating 354 can be of 10 mm if the water barrier 140 is formed by a wrapped metal foil, or can be of 20 mm if the water barrier 140 is formed by a wrapped polylaminate foil.

Figure 2:
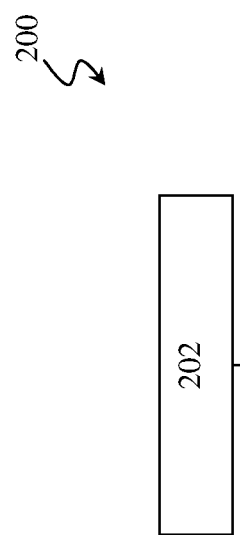
FIG. 2 is a flow chart depicting operations of a method for manufacturing the cable of FIGS. 1A and 1B according to an embodiment of the present invention.

FIG. 2 is a flow chart depicting operations of a process 200 for manufacturing the cable 100 of FIG. 1A and particularly for manufacturing the water barrier 140 to be arranged around the filler 135 of the cable 100, according to an embodiment of the present invention.

The process 200 provides for manufacturing the cable 100 according to any one among the solutions known in the art until the stranding of the insulated conductors, when the insulated conductors 105 are joined, optionally by a binder tape (not illustrated), and, e.g., helically stranded together in a conventional manner, for example with a SZ-lay-up. The interstitial zones generated by the stranding of the insulated conductors 105 are then filled with the filler 135, giving rise to the formation of a cylindrical cable work piece comprising the insulated conductors 105 and the filler 135.

Figure 3A:
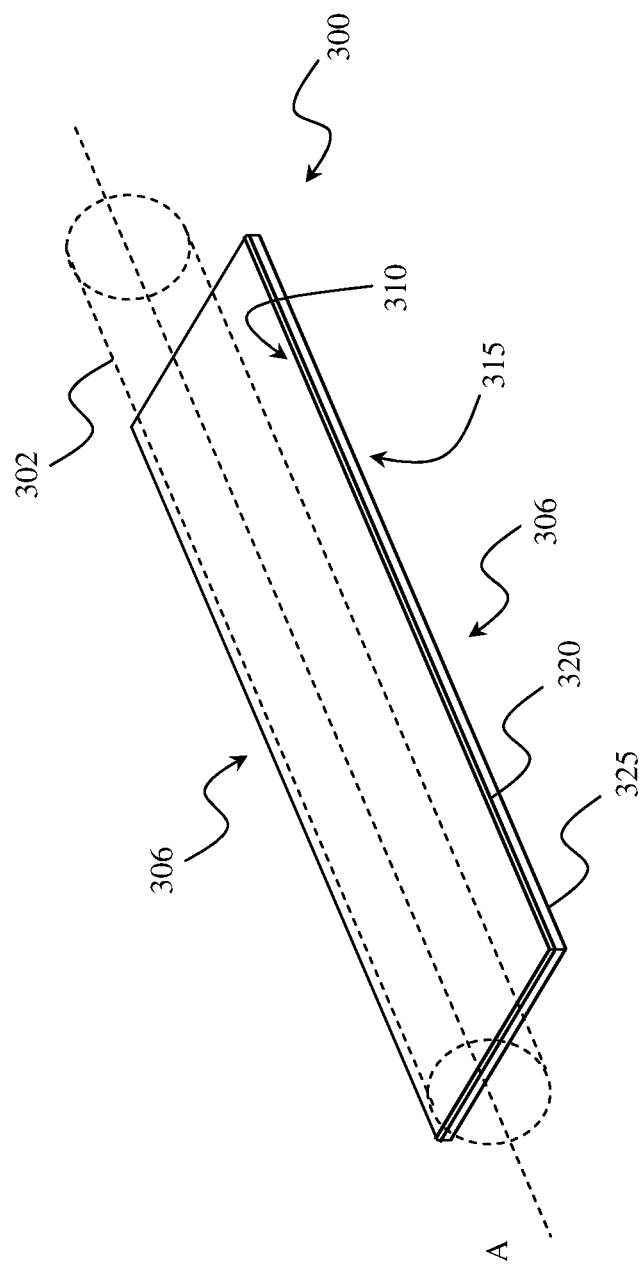

The phase 202 of the process 200 is sketched in FIG. 3A and comprises providing a polylaminate foil 300 and placing the cable work piece comprising the insulated conductors 105 and the filler 135—globally identified with reference 302—on said foil 300. The polylaminate foil 300 comprises a first layer 320 of metal material, and a second layer 325 of polymer material, and has the shape of a tape, with two opposite edges 306, substantially parallel to the longitudinal axis A of the cable work piece 302. The polylaminate foil 300 comprises two main surfaces opposite to each other, namely a first surface 310 and a second surface 315, delimited by the edges 306 and by the foil end.

In the embodiment of the invention illustrated in the figures, the first surface 310 of the foil 300 is the exposed surface of the first layer 320, and the second surface 315 is the exposed surface of the second layer 325.

Each edge 306 can have a length varying from case to case. For example, the edge 306 can be up to 1500-3000 m long. When the length of the edge 306 is shorter than that of the cable span to be manufactured, two or more foils 300 can be used and adjoined at the respective end to provide for continuity for the cable to be produced.

Preferably, the cable work piece 302 is positioned substantially on the middle of the first surface 310 of the foil 300, with the longitudinal axis thereof parallel to the edges 306.

The next phase 204 of the method 200 provides for wrapping the polylaminate foil 300 around the cable work piece 302 by overlapping the edges 306 one to each other, and then for depositing a bonding agent, such as a layer of polymeric adhesive resin 330, between the overlapping edges 306, in such a way to fasten the wrapped polylaminate foil 300 around the cable work piece 302, as sketched in FIG. 3B. In this way, a water barrier 140 surrounding the cable work piece 302 is obtained.

FIG. 3C is a cross-sectional view of the foil seam 235 of FIG. 3B after phase 204 of the method 200.

The polymeric adhesive resin forming the layer 330 does not prevent moisture diffusion. Moisture may disadvantageously diffuse toward the inner layers of the cable 100 through the radially externally exposed portion of the resin layer 330. Moreover, moisture may diffuse toward the inner layers of the cable 100 also through the outer surface of the second layer 325 of the polylaminate foil 300 at the lower overlapped edge 306 thereof if the polymer material of the second layer 325 becomes sufficiently imbibed (for example, if the cable 100 is installed underwater).

For this purpose, according to an embodiment of the present invention, in order to avoid (or at least reduce) the moisture diffusion, the method 200 provides for a deposition phase 206 directed to form, through a thermal spray process, a metal coating at least on the foil seam 235 of the water barrier 140. The presence of the metal coating is capable of delaying the moisture penetration through the outer surface of the second layer 325 of the polylaminate foil 300 and the polymer material thickness, thereby minimizing the moisture diffusion even in this case.

FIG. 3D is a sketched view of the water barrier 140 during an exemplary deposition phase 206, in which a cold spray gun device 350 is spraying a jet 352 comprising metal particles (e.g., copper, tin or aluminium) over a portion of the surface of the water barrier 140 at the foil seam 235, to depose a metal coating 354 according to an embodiment of the present invention. The water barrier 140 and the cable work piece 302 advance at unison under the cold spray gun device 350 at a speed of, preferably, 50 mm/s to 1000 mm/sec, for example of 100 mm/s.

The cold spray gun device 350 comprises a chamber 360 where metal to be deposed is provided in form of powder. In chamber 360 the particles of the metal are accelerated. A feeder 365 is coupled to the chamber 360 for supplying the metal powder. A supply unit 370 is further coupled to the chamber 360 for providing the high velocity process gas stream to propel the metal powder. In some embodiments, the process gas may comprise helium, nitrogen, air, or any suitable gas. The chamber 360 is further coupled to a nozzle 375 adapted to control the direction and the velocity of the jet 352 carrying the metal particles exiting the chamber 360 toward the surface of the water barrier 140. The process gas may accelerate the metal particles to velocities of 100 to 1500 m/s.

FIG. 3E is a cross-sectional view of the foil seam 235 of FIG. 3D after phase 206 of the process 200. The metal coating 354 covers both the two overlapping edges 306 of the polylaminate foil 300, as well as the resin layer 330 portion exposed from the foil seam 235. For example, the metal coating 354 may have a thickness (along a direction perpendicular to the polylaminate foil 300 surface) of about 0.2 mm and may have a width (along a direction parallel to the polylaminate foil 300 surface and perpendicular to the foil seam 235) of 20 mm.

Following the formation of the metal coating 354, the manufacturing of a cable as from, for example, FIG. 1A, provides for surrounding the water barrier 140 with the coating layer 145 and the outer sheath 150, generated for example through an extrusion process, according to method known by the skilled person.

Although in the present description reference has been made to a process for manufacturing a cable comprising steps directed to manufacture a water barrier to be arranged around the filler enclosing all the (three) insulated conductors of the cable, similar considerations apply when the process described above is used to manufacture water barriers to be arranged around each insulated conductor and relevant metal screen of the cable. Mixed solutions are also contemplated, in which the cable is provided with a water barrier for each insulated conductor and, at the same time, with a common water barrier surrounding the filler which surrounds all the insulated conductors of the cable.

According to another embodiment of the present invention, the previously described process 200 of FIG. 2 may be carried out by positioning the cable work piece 302 on the exposed surface of the second layer 325 of the foil 300 instead of on the first layer 320 thereof, so as to manufacture a water barrier 140 in which the inner layer thereof is the second layer 325 of polymer material and the outer layer thereof is the first layer 320 of metal material.

In the case the polylaminate foil is wrapped with the metal layer radially external to the polymeric layer, the thermal sprayed metal coating over the foil seam provides continuity of the metal layer by sealing the exposed polymeric surfaces.

Moreover, in order to manufacture the cable 100 of FIG. 1B, according to an embodiment of the present invention the previously described process 200 of FIG. 2 is carried out by employing a metal foil 300' instead of the polylaminate foil 300.

EXAMPLE

A copper coating has been deposed—with a precision suitable to efficiently cover the foil seam of a polylaminate foil—to reach a deposition thickness of 0.2 mm. Micrographs of the copper coating shown that the deposed layer has a high homogeneity and a very low porosity (not higher than 0.3%). Preliminary bending tests have been carried out, showing that the mechanical strength of the copper layer is sufficient to sustain strain and compression stresses without cracking and/or detachment from the substrate.

The invention claimed is:

1. A method for manufacturing power cables, the method comprising:
   providing at least one insulated conductor; and
   arranging a water barrier around the at least one insulated conductor;
   wherein the arranging of the water barrier comprises:
      providing foil having two opposite edges;
      wrapping the foil around the at least one insulated conductor until the edges of the foil overlap each other;
      fastening the overlapped edges of the foil to each other with bonding agent to form a corresponding foil seam; and
      depositing a metal coating on the foil at the foil seam by a thermal spray process.

2. The method of claim 1, wherein the depositing of the metal coating is carried out by a cold spray process.

3. The method of claim 1, wherein the fastening of the overlapped edges to each other with the bonding agent comprises depositing a layer of polymeric adhesive resin between the overlapped edges.

4. The method of claim 1, wherein the depositing of the metal coating comprises depositing a copper coating, a tin coating, or an aluminum coating.

5. The method of claim 1, wherein the depositing of the metal coating comprises spraying a jet comprising metal particles over a portion of the water barrier at the foil seam, and
   wherein the metal particles in the jet are accelerated to velocities greater than or equal to 100 meters per second (m/s) and less than or equal to 1,500 m/s.

6. The method of claim 1, wherein the fastening of the overlapped edges to each other with the bonding agent comprises depositing a layer of adhesive between the overlapped edges.

7. The method of claim 1, wherein the fastening of the overlapped edges to each other with the bonding agent comprises depositing a layer of adhesive resin between the overlapped edges.

* * * * *